United States Patent [19]

DeVale et al.

[11] 4,440,200

[45] Apr. 3, 1984

[54] LIQUID DISPENSER WITH TIMING CIRCUIT

[75] Inventors: Donald P. DeVale, Sycamore; Joseph Wieser, Lake Villa, both of Ill.

[73] Assignee: Everpure, Inc., Westmont, Ill.

[21] Appl. No.: 262,923

[22] Filed: May 12, 1981

[51] Int. Cl.³ ............................................. B65B 1/42
[52] U.S. Cl. .................................... 141/95; 141/198; 141/360
[58] Field of Search ....................... 222/23, 52, 54, 70, 222/129.4, 642, 638, 639, 640, 641; 141/94, 95, 96, 367, 368

[56] References Cited

U.S. PATENT DOCUMENTS

| | | |
|---|---|---|
| 3,265,099 | 8/1966 | Severino et al. . |
| 3,272,217 | 9/1966 | Young . |
| 3,273,752 | 9/1966 | Horeczky . |
| 3,310,203 | 3/1967 | McCann . |
| 3,349,881 | 10/1967 | Camp . |
| 3,666,143 | 5/1972 | Weston . |
| 3,823,846 | 7/1974 | Probst . |
| 3,825,153 | 7/1974 | Patrick et al. .................. 194/13 X |
| 3,895,738 | 7/1975 | Buchanan et al. . |
| 3,916,963 | 11/1975 | McIntosh . |
| 3,976,222 | 8/1976 | Spagnolo . |
| 4,040,457 | 8/1977 | Niese et al. . |
| 4,202,387 | 5/1980 | Upton . |

FOREIGN PATENT DOCUMENTS 938442 10/1963 United Kingdom .

*Primary Examiner*—Stanley H. Tollberg
*Attorney, Agent, or Firm*—Hill, Van Santen, Steadman & Simpson

[57] ABSTRACT

The present invention relates to an improved liquid dispenser machine for automatically dispensing small, medium or large cups of liquid and eliminates the oscillator required in prior art systems as well as provides feedback to prevent chattering and oscillatory operation of the liquid dispenser valve and also includes a predetermined time delay in the timing circuit which allows fast change of cups without starting the timer.

1 Claim, 6 Drawing Figures

LIQUID DISPENSER WITH TIMING CIRCUIT

BACKGROUND OF THE INVENTION

1. Field of the Invention

This invention relates in general to automatic liquid dispensers which are capable of sensing the size of a cup which is placed on the machine and which automatically fills either a small, medium or a large cup without operation or attendance by the operator.

2. Description of the Prior Art

Prior art automatic dispensers have used oscillators which were moisture sensitive and such oscillators have failed due to burn out as, for example, by failure of the current limiting resistor. Also, in the prior art dispensers, if a cup was quickly changed a short cup would result rather than being completely filled. Also, in systems of the prior art, sources such as the sun have tended to swamp the infra-red sensing systems so as to prevent pulses from passing through the sensor.

SUMMARY OF THE INVENTION

The present invention provides an improved automatic liquid dispensing system for dispensing and filling small, medium and large cups. A feature of the present invention is that it eliminates the oscillator of the prior art which was moisture sensitive and tended to fail due to the moisture of the environment of the dispenser.

Another feature of the present invention is that it provides shielding for the infra-red sensors so as to substantially eliminate swamping caused by ambient light sources such as the sun.

The present invention also eliminates a cup being only partially filled due to quick change of a cup.

Another object of the invention is that feedback is provided so as to prevent chattering in the operation of the solenoid valve due to chattering caused by the controlling thyristor turning on and off. This has been eliminated by providing a feedback circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 4A:
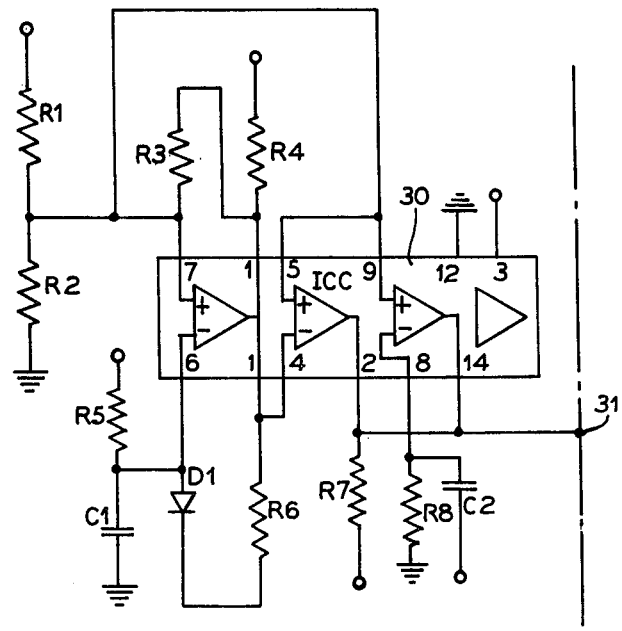
FIGS. 4A and 4B illustrate a circuit of the prior art.
Figure 4B:
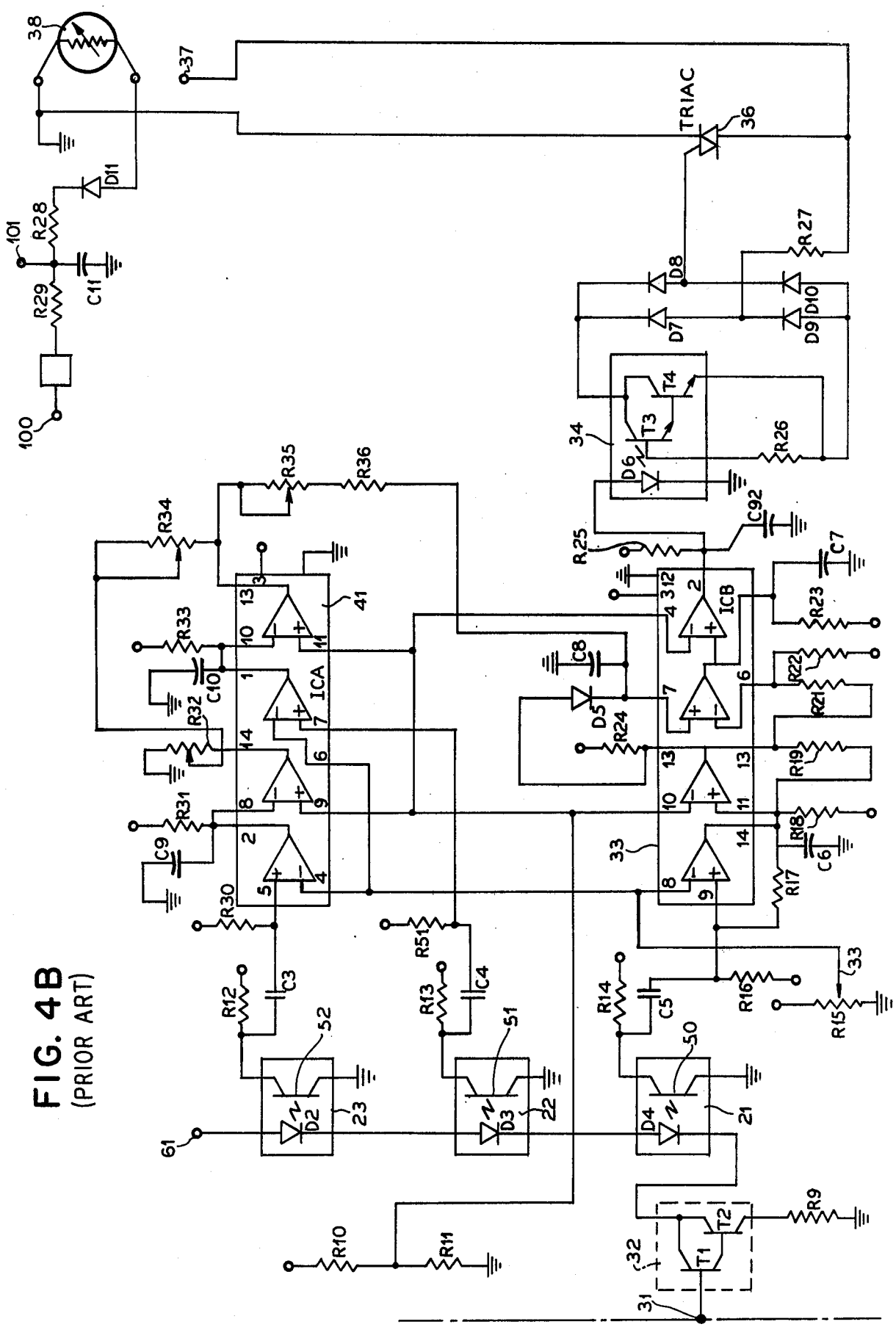

A sensor of the prior art which actuated the solenoid control valve of the dispensing unit is illustrated in FIGS. 4A and 4B. An oscillator comprises an ICC 30 and resistors R1 and R2 connected between a suitable voltage source and ground and the junction point between resistors R1 and R2 was connected to terminals 7 of integrated circuit 30. Resistor R3 was connected between terminal 7 and 1 has a resistor R4 was connected between a suitable voltage source and terminal 1 of the integrated circuit 30. Terminals 7 and 9 were connected together. Terminal 12 was connected to ground and terminal 3 was connected to a suitable voltage source. A resistor R5 was connected between a suitable voltage source and ground through a capacitor C1 and the junction between the resistor R5 and capacitor C1 was connected to terminal 6 of circuit 30. A diode D1 was connected between terminal 6 and a resistor R6 which has its other side connected to terminals 1 and 4 of circuit 30. A resistor R7 was connected from terminal 2 and a suitable voltage source. A resistor R8 was connected between ground and terminal 8. A capacitor C2 was connected from terminal 8 to a suitable voltage source. A terminal 31 was connected to terminals 14 and 2. The terminal 31 as shown in FIG. 4B was connected to a Darlington circuit 32 comprising the Darlington connected transistors T1 and T2. A resistor R9 was connected between ground and the Darlington circuit 32. The output of the Darlington circuit was connected to the sensors 21, 22 and 23 which comprise respectively the diodes D4, D3 and D2 and suitable detectors 50, 51 and 52. The output of the sensor 21 is supplied from the detector 50 through a capacitor C5 to the ICC circuit 33 at terminal 9. Terminal 8 is connected to a potentiometer R15 by wiper contact 33. A resistor R17 and a capacitor C6 are connected from terminal 9 to ground. Terminal 14 connects to the junction point between the capacitor C6 and the resistor R17. Terminal 11 is connected to terminal 14 and to a resistor R18. A resistor R19 is connected between terminals 11 and 13 of circuit 33. A resistor R21 is connected between terminals 13 and 6. A resistor R22 is connected from terminal 6 to a suitable voltage supply. A resistor R23 is connected from a suitable voltage supply to the circuit 33 and a capacitor C7 is connected from one end of the resistor R23 to ground.

A diode D5 is connected between pins 7 and 13 and a resistor R24 is connected between pin 13 and a suitable voltage source. A capacitor C8 is connected between pin 7 and ground. The sensor 22 has its detector 51 connected to a resistor R13 and to a capacitor C4 and to terminal 7 of a integrated circuit ICA 41. Terminal 4 of circuit 41 is connected to terminal 8 of circuit 33. Terminal 9 of circuit 41 is connected to terminal 10 of circuit 33. Terminal 11 is connected to terminal 9 of circuit 41 and terminal 11 of circuit 41 is connected to terminal 4 of circuit 33. Sensor 23 has its sensor 52 connected through capacitor C3 to terminal 5 of circuit 41. Terminals 2 and 8 are connected together and capacitor C9 is connected from terminals 2 and 8 to ground. Terminal 14 of circuit 41 is connected to a potentiometer R32 which has its other side connected to ground. The potentiometer R32 determines the timing for the additional fill on the large cup. Terminals 1 and 10 of circuit 41 are connected together and the capacitor C10 is connected between terminals 1 and 10 are ground. Terminal 13 is connected to a potentiometer R34 which has its other side connected to potentiometer R32. The potentiometer R34 determines the additional fill of the medium size cup. Terminal 13 is also connected to a potentiometer R35 which determines the fill of the small cup. The other side of potentiometer R35 is connected to a resistor R36 which is connected to terminal 7 of integrated circuit 33.

Terminal 2 of circuit 33 is connected to an output isolator 34 which includes a diode D6 and Darlington connected transistors T3 and T4. The output of the isolator 34 is connected to opposite ends of diodes D7, D8 and diodes D9 and D10 and the junction point between the diodes D8 and D10 is connected to the gating control of TRIAC 36. The connection between diodes D7 and D9 is connected through a resistor R27 to one side of the TRIAC and to a terminal 37 which is in circuit with the solenoid energizing circuit for the valve which dispenses the beverage from the nozzle 16.

Thus, the circuit of FIGS. 4A and 4B utilizes the oscillator comprising the circuit illustrated in FIG. 4A and automatically senses either small, medium or a large cup and energizes the TRIAC for a sufficient time so as to fill the small, medium or large cup. The potentiometers R35, R34 and R32 respectively, control the time of fill of the small, medium and large cups with the potentiometer R35 controlling the time of fill of the small cup and the combination of potentiometers R35 and R34 determining the time of filling the medium size cup and the three potentiometers R32, R34 and R35 determining the time of fill of the large cup.

As stated previously, the circuit illustrated in FIGS. 4A and 4B has the disadvantages in that the oscillator is subject to moisture which causes the device to become inoperative. Furthermore, there are timing problems with this circuit because if a cup is quickly changed the second cup will only be partially filled. Also, with the circuit of the prior art oscillation of the TRIAC 36 and the control valve can occur.

Figure 5:
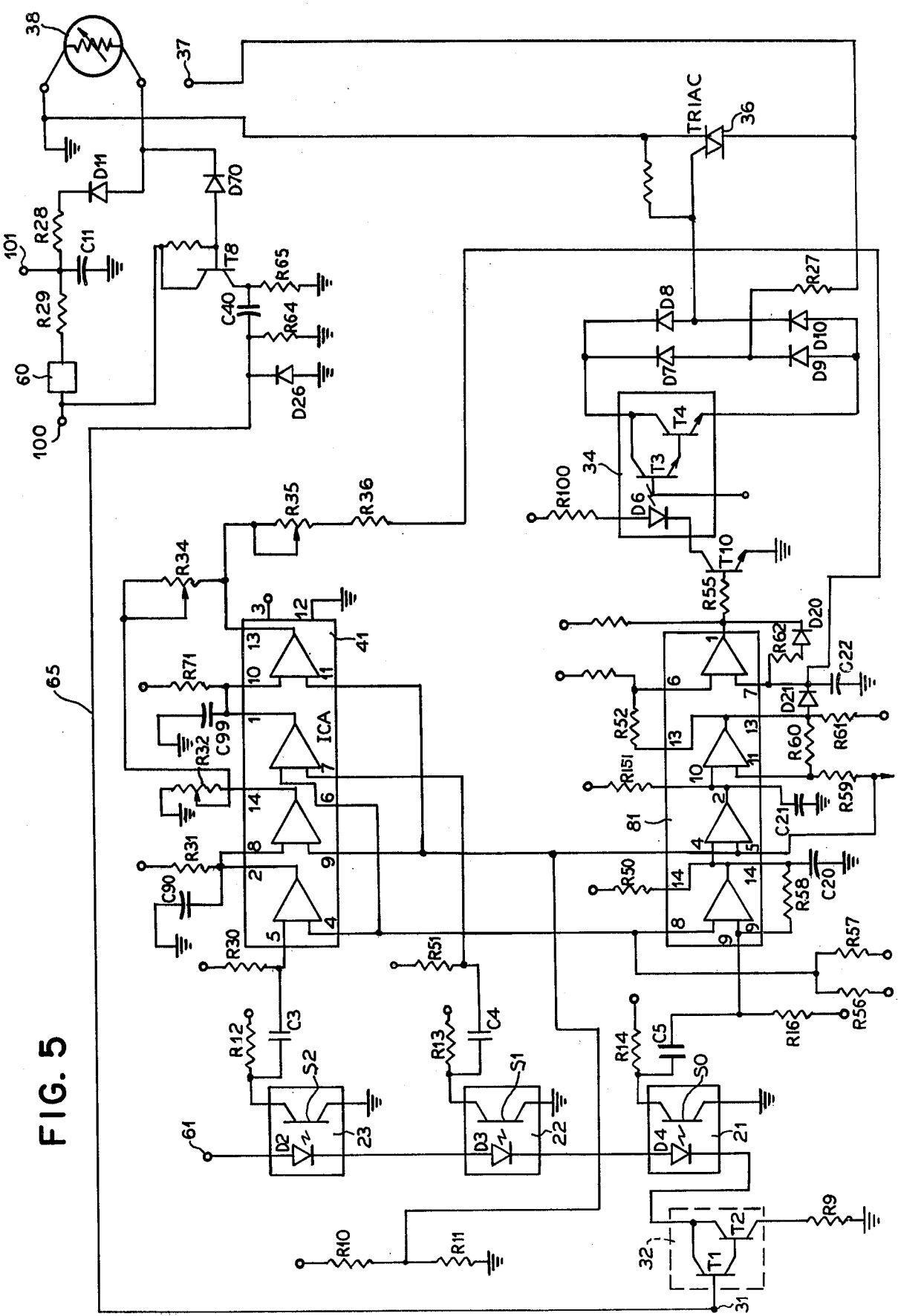
FIG. 5 illustrates an electrical schematic of the circuit of the invention.

FIG. 5 illustrates the improved circuit of the invention in which like elements are designated by the same designations.

One of the key differences between the circuit of the invention is that instead of the oscillator illustrated in FIG. 4A, an energizing pulse is removed from the AC power supply supplied at terminal 100 which passes to the transistor T8 and through the capacitor C40 on lead 65 to the terminal 31 and to the Darlington circuit 32 where it energizes the sensors 21, 22 and 23 which also receive power on the input terminal 61. Thus, the circuit of the improved sensor does not have an oscillator but operates directly upon the AC power supply and that the failure of the oscillator will not render the sensor inoperative as in prior art systems. The transistor T8 and the Darlington circuit 32 comprise a pulse generating circuit. An integrated circuit 81 receives on terminal 9 the output of the small cup sensor 21 through the capacitor C5 when a small cup is present on the dispensing mechanism. A resistor R151 connected to terminal 10 of circuit 81 and a capacitor C21 connected between ground and terminal 10 of circuit 81 provide an on delay of, for example, about 0.2 seconds so that the TRIAC 36 will not be energized until the cup has been present for the delay determined by the resistor R51 and the capacitor C21. This prevents the mere placing of the hand or some other object in the path of the sensor 21 from energizing the dispenser valve.

A suitable voltage source is connected to the other side of resistor R51 as, for example, 5 volts.

In order to prevent chatter of the circuit, terminal 7 is connected to a resistor R62 and to a diode D20 and to terminal 1 of circuit 81. This feedback path of the resistor R62 and diode D20 prevents chattering of the energization of the circuit due to the feedback which is supplied from terminal 1 to terminal 7. Terminal 7 is connected to the resistor R36 and to the small cup setting potentiometer R35 which has its other side connected to the medium cup setting potentiometer R34 which has its other side connected to the large cup setting potentiometer R32.

In operation, when a cup is placed before the sensor 21 infra-red energy will be detected by the detector 21 which will after a delay time as determined by the value of resistor R151 and capacitor C21 will energize the TRIAC 36 for a time depending upon the setting of the potentiometer R35 and the value of the capacitor C22. If a medium size cup is placed on the dispenser, the sensors 22 and 21 will both be energized and the TRIAC 36 will be energized to energize the dispenser for a time depending upon the settings of the resistors R35 and R34. If a large cup is set on the sensor, the sensors 21, 22 and 23 will all be energized and the TRIAC 36 will be energized for a period depending upon the setting of the potentiometers R35, R34 and R32.

In a particular embodiment constructed according to the invention, the following value of components were utilized. +5 volts was applied to resistors R1, R4, R5 and terminal 3 of circuit 30 as well as to resistor R10, R30, R31, R33, R18, R22, R23, R16, R56, Terminal 100, R53, R54, R50. 25 volts is applied to terminals 61 to resistors R12, R13 and R14 through terminal 101 and to resistor 100.

Capacitor C1 was 0.022 $\mu$F. Capacitor C2 was 0.1 $\mu$F. Capacitor C3 was 0.001 $\mu$F. Capacitor C4 was 0.001 $\mu$F. Capacitor C5 was 0.001 $\mu$F. Capacitor C9 was 0.3 $\mu$F. Capacitor C10 was 0.3 $\mu$F. Capacitor C90 was 0.1 $\mu$F. Capacitor C99 was 0.1 $\mu$F. Capacitor C6 was 0.1 $\mu$F. Capacitor C7 was 0.1 $\mu$F. Capacitor C92 was 0.22 $\mu$F. Capacitor C8 was 22 $\mu$F. Capacitor C21 was 0.1 $\mu$F. Capacitor C22 was 22 $\mu$F.

Selective values of resistors were, resistors R1 and R2 were 100K. Resistors R3 was 220K. Resistor R4 is 4.7K. Resistor R6 was 4.7K. Resistor R7 was 1K. Resistor R8 was 3.3. Resistor R9 is 3.6 ohms. Resistor R10 was 3.3K. Resistor R11 is 2.2K. Resistor R12 is 100K. Resistor R13 is 100K. Resistor R14 is 100K. Resistor R16 is 100K. Resistor R13 is 100K. Resistor R14 is 100K. Resistor R16 is 100K. Resistor R15 is 100K. Resistor R17 is 1 Mohm. Resistor R18 is 170K. Resistor R19 is 470K. Resistor R21 is 1.5K. Resistor R22 is 10K. Resistor R23 is 3.3 Meg ohms. Resistor R24 is 3.9K. Resistor R31 is 470K. Resistor R32 is 200K. Resistor R33 is 470K. Resistor R34 is 200K. Resistor R35 is 200K. Resistor R36 is 27K. Resistor R56 is 100K. Resistor R57 was 47K. Resistor R58 is 1 mega-ohm. Resistor R59 is 470K. Resistor R60 is 470K. Resistor R61 is 1.5K. Resistor R52 is 2.2K. Resistor R53 is 10K. Resistor R54 is 10K. Resistor R51 is 100K ohm. Resistor R50 is 1 mega-ohm. Resistor R31 is 1 mega-ohm. Resistor R71 is 1 mega-ohm. Resistor R151 is 2.2 mega ohm.

Figure 1:
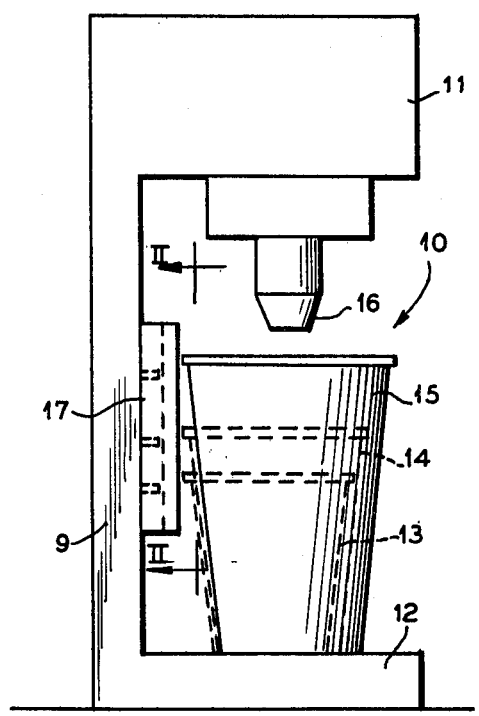
FIG. 1 is a side plan view of a dispenser according to the invention.
Figure 2:
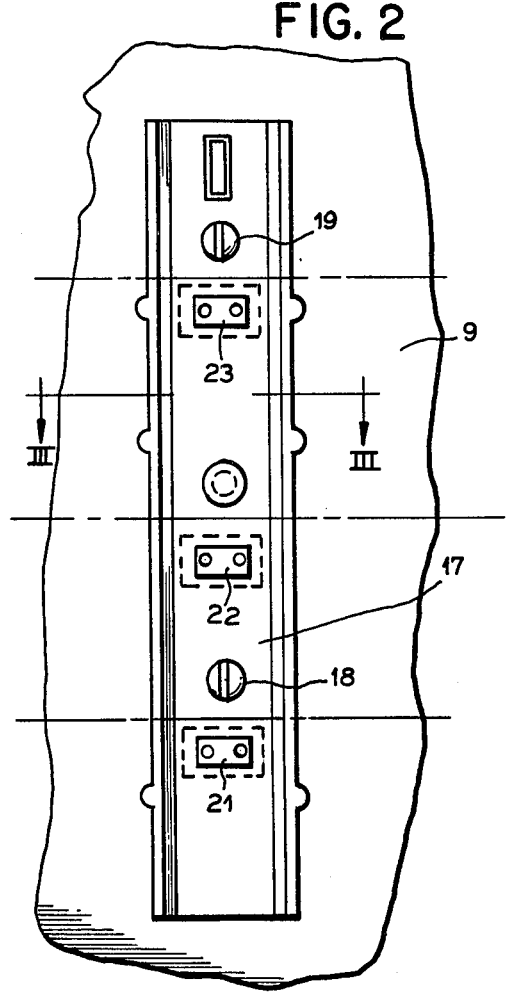
FIG. 2 is a front plan view of a sensor unit for a dispenser.

FIG. 1 illustrates the dispenser 10 which has a base 12 and an upright 9 to which the sensor unit 17 is attached and an upper unit 11 which supports the nozzle 16. Small cups 13, medium cups 14 or large cups 15 can be placed on base 12 and the sensors 21, 22 and 23 will detect and energize the dispensor value to fill the cups. Mounting screws 18 and 19 hold the unit 17 to the upright 9.

Figure 3:
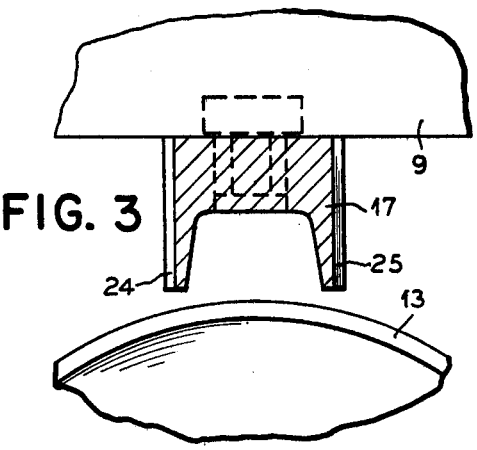
FIG. 3 is a sectional view taken on line III—III illustrating a sensor.

As shown in FIG. 3 the sensor unit 17 is formed with extending sides 24 and 25 to shield the sensors 21, 22 and 23 from ambient light such as sun light which would saturate the sensors.

Although the invention has been described with respect to preferred embodiments, it is not to be so limited as changes and modifications can be made which are within the full intended scope of the invention as defined by the appended claims.

We claim as our invention:

1. A beverage dispenser for automatically filling cups of different sizes comprising, a stand on which cups of various sizes can be placed, small, medium and large cup sensors for small, medium and large cups mounted on said stand and positioned to sense the cups of different sizes, a fluid dispensing valve and nozzle mounted on the stand for filling said cups, an a.c. voltage source, said small, medium and large cup sensors connected to said a.c. voltage source and passing pulses to their outputs when cups of various sizes are present on said stand, an on delay circuit connected to the output of the small cup sensor and producing an output signal only if said small cup dispenser is energized for a finite time, a beverage dispensing switch means connected to said fluid dispensing valve to control it and receiving the output of said on delay circuit, and small, medium and large cup timing circuits connected to said small, medium and large cup sensors and supplying an input to said beverage dispensing switch means, wherein said small cup timing circuit comprises a capacitor and a first resistor, wherein said medium cup timing circuit includes a second resistor which is placed in series with said first resistor when said medium cup sensor is energized, including a third resistor which is placed in series with said first and second resistors when said large cup sensor is energized, and wherein said on delay circuit comprises a fourth resistor and a second capacitor, including a feedback means connected to said on delay circuit and said beverage dispensing switch means to prevent it from chattering, and wherein said feedback means comprises a fifth resistor and an unilateral current means.

* * * * *